(12) United States Patent
Visalli et al.

(10) Patent No.: US 7,899,860 B2
(45) Date of Patent: Mar. 1, 2011

(54) METHOD AND SYSTEM FOR HIGH-SPEED FLOATING-POINT OPERATIONS AND RELATED COMPUTER PROGRAM PRODUCT

(75) Inventors: Giuseppe Visalli, Messina (IT); Francesco Pappalardo, Paterno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1241 days.

(21) Appl. No.: 11/190,501

(22) Filed: Jul. 26, 2005

(65) Prior Publication Data

US 2007/0027946 A1   Feb. 1, 2007

(51) Int. Cl.
*G06F 7/50* (2006.01)
*G06F 15/00* (2006.01)

(52) U.S. Cl. ...................... 708/710; 708/211

(58) Field of Classification Search ................ 708/205, 708/211, 505
See application file for complete search history.

(56) References Cited

U.S. PATENT DOCUMENTS

| | | | | |
|---|---|---|---|---|
| 4,623,982 A | * | 11/1986 | Ware | 708/714 |
| 5,343,413 A | * | 8/1994 | Inoue | 708/205 |
| 5,831,884 A | * | 11/1998 | Suzuki | 708/505 |
| 5,844,826 A | | 12/1998 | Nguyen | |
| 5,974,432 A | | 10/1999 | Orup | |
| 6,631,393 B1 | * | 10/2003 | Dai | 708/710 |

OTHER PUBLICATIONS

Ruiz G.A. et al., "An area-efficient static CMOS carry-select adder based on a compact carry look-ahead unit," Microelectronics Journal, Dec. 1, 2004, pp. 939-944, vol. 35, No. 12, Mackintosh Publications Ltd., Luton, GB.

Tsin-Yuan Chang et al., "Leading-Zero Anticipatory Logics for Fast Floating Addition with Carry Propagation Signal," Circuits and Systems, Proceedings of the 40th Midwest Symposium, Aug. 3-6, 1997, pp. 385-388, Sacramento, California.

Hokenek E. et al., "Leading-zero acticipator (LZA) in the IBM RISC System/6000 floating-point execution unit," IBM Journal of Research and Development, Jan. 1, 1990, pp. 71-77, vol. 34, No. 1., New York, NY.

* cited by examiner

*Primary Examiner*—Chuong D Ngo
(74) *Attorney, Agent, or Firm*—Lisa K. Jorgenson; E. Russell Tarleton; Seed IP Law Group PLLC

(57) ABSTRACT

A circuit for estimating propagated carries in an adder starting from operands that include actual addition inputs or at least one earlier carry, the circuit performs statistical circuit operations with independent binary traffic for the operands. Preferably, this binary traffic is independent and equiprobable or quasi-equiprobable binary traffic, and the adder is a leading zero anticipatory logic integer adder producing a number having the same number of leading zeroes as the result of the integer addition performed. The carry value may be produced from a logic function (e.g., Karnaugh Map, Quine-Mc-Clusky) of the operands, as a logic combination of the operands covering all the 1s in the logic function.

9 Claims, 12 Drawing Sheets

FIG. 4

| $A_i, B_i$ \ $C_{i-1}$ | 00 | 01 | 11 | 10 |
|---|---|---|---|---|
| 0 | 0 | 0 | 1 | 0 |
| 1 | 0 | 1 | 1 | 1 |

| $A_i, B_i$ \ $C_{i-1}$ | 00 | 01 | 11 | 10 |
|---|---|---|---|---|
| 0 | 0 | 1 | 1 | 1 |
| 1 | 0 | 1 | 1 | 1 |

$\tilde{C}_i$
$\tilde{C}_i = A_i + B_i$

| $A_i, B_i$ \ $A_{i-1}, B_{i-1}$ | 00 | 01 | 11 | 10 |
|---|---|---|---|---|
| 00 | 0 | 0 | 0 | 0 |
| 01 | 0 | 0 | 1 | 0 |
| 11 | 1 | 1 | 1 | 1 |
| 10 | 0 | 0 | 1 | 0 |

$C_{i-2}=0$

| $A_i, B_i$ \ $A_{i-1}, B_{i-1}$ | 00 | 01 | 11 | 10 |
|---|---|---|---|---|
| 00 | 0 | 0 | 0 | 0 |
| 01 | 0 | 1 | 1 | 1 |
| 11 | 1 | 1 | 1 | 1 |
| 10 | 0 | 1 | 1 | 1 |

| $A_i, B_i$ \ $A_{i-1}, B_{i-1}$ | 00 | 01 | 11 | 10 |
|---|---|---|---|---|
| 00 | 0 | 0 | 0 | 0 |
| 01 | 0 | 1 | 1 | 1 |
| 11 | 1 | 1 | 1 | 1 |
| 10 | 0 | 1 | 1 | 1 |

METHOD AND SYSTEM FOR HIGH-SPEED FLOATING-POINT OPERATIONS AND RELATED COMPUTER PROGRAM PRODUCT

BACKGROUND OF THE INVENTION

1. Field of the Invention

The invention relates to methods and systems for floating-point operations and has been developed with particular attention to its use in VLSI (Very Large-Scale Integration) circuit implementation of signal processing applications.

2. Description of the Related Art

A floating-point arithmetic support is a major asset in permitting easy and effective implementation of modern multimedia and signal processing in VLSI circuits. A floating-point signed adder, able to perform addition and subtraction, represents the basic arithmetic operator in many signal processing applications.

VLSI implementation of such an adder involves a very high number of logic modules in order to perform the basic steps of operand (significand) alignment, integer addition, re-normalization, and rounding.

Floating-point operators are preferably implemented using a pipeline architecture, which drastically increases the maximum throughput. A general-purpose microprocessor (such as, e.g., the Intel Pentium® microprocessor) employs a deep pipeline, which permits the execution of floating-point operations in several clock cycles. Such a processor typically includes more than ten pipeline stages. Operation thereof does not exclusively rely on floating point (FP) adders and multipliers, in that the processor includes complex circuits such as, e.g., dividers, square root extraction circuits for use in image processing and so on. The standard literature on FP adders indicates an adder including 4-5 stages as a "good" adder. High-speed adders typically include 3 stages.

Embedded cores (such as ST230, also called LX-Mobile) have a shorter pipeline depth, which forces them to perform the floating-point operation in a few clock cycles. Specifically, in the case of Lx-Mobile, the three-stage structure is purely notional, in that the first and third stages are partly occupied by external logical circuitry. The equivalent latency in terms of the ratio of the total delay to the clock period is around 2.25 clock cycles.

High-speed floating-point addition procedures typically employ a Leading Zero Anticipatory Logic (LZA) circuit to partially perform the re-normalization process in parallel with the execution of the integer addition. A LZA logic circuit is currently included in commercial solutions such as the Super H (ST-Hitachi) and IBM RISC system/6000. Unfortunately, this approach introduces a small precision error in the results.

A high-speed floating-point signed addition represents a major task for a core processor that dedicates few clock cycles in the execution pipeline. Unfortunately, this important operation requires several tasks that employ the major latencies in a VLSI circuit implementation.

In particular, the problem of counting the leading zeroes produced by the integer adder arises whenever a subtraction operation (addition with opposite signs) is performed with two floating-point numbers. In that case the "absolute" result produces several zeroes thus leading to an un-normalized result. A re-normalization unit is therefore used to count the leading zeroes and shift the un-normalized result according to the leading-zero count.

Generally, this operation involves one clock cycle in latency. The use of a leading zero anticipatory logic permits execution of the leading zero count in parallel with the computation of the integer sum.

In FIG. 1A an integer sum operation is schematically shown as performed in an adder module 30, starting from operands (significands) stored in two registers 10 and 20. The result of the sum operation is fed to a leading zero counter 40 and after a clock cycle the output of the leading zero counter 40 is used to perform the normalization of the sum in a shifter module 50. Finally, the result of the normalization is stored in a register 60.

In the arrangement shown in FIG. 1B, a leading zero anticipatory module 45 operates in parallel with the adder module 30. In this case, the shifter module 50 can perform the normalization of the sum in the subsequently clock cycle, saving one clock cycle.

Background literature concerning the Leading Zero Anticipatory (LZA) approach includes T. Chang, J. Huang and S. Yang "Leading-zero anticipatory logics for fast floating additions with carry propagation signal" IEEE 1997, and H. Suzuki, H. Morinaka, H. Makino, Y. Nakase, K. Mashiko, and T. Sumi "Leading Zero anticipatory logic for high-speed floating-point additions" IEEE Journal of Solid State Circuits, Vol. 31 199. These articles explain, i.a., how the circuitry introduces a wrong estimation, subtracting two nearby operands (significands).

As indicated, an integer adder for floating point operands (significands) represents an important element in a floating-point signed adder. This circuit is dedicated to executing the operand (significand) addition. This operation is anticipated by the operand (significand) alignment in order to compute two floating-point numbers with the same exponent value.

In general terms, the problem of integer addition has different solutions depending on different design criteria: high-speed adder, low-area adder and low-power adder. Basically, a number of different solutions are known and currently used, namely:

Carry Ripple Adders,
Carry Look Ahead and Brent-Kung approach, and
Carry Skip Adders.

More to the point, one may distinguish a first category of solutions where the carry signal is propagated from a full adder (FA) to the next adder. This solution represents the simplest way of performing integer addition, but is affected by large latencies.

The Carry Look Ahead (CLA) and the Brent Kung approaches directly compute the carry input in each full adder without propagating this signal from a full adder to the next one. This solution entails notable area consumption when operating with "deep" integer adders, but drastically reduces the involved latencies operating at higher frequencies.

FIG. 2 shows a typical Carry Ripple Adder layout. This circuit represents the slowest solution for integer addition. It is based on carry propagation from a full adder to the adjacent one. So the total latency is M times greater than the latency of a single full-adder (where M is the number of full adders involved).

In particular, each output and carry operation follows the Boolean expressions:

$$S_i = A_i \oplus B_i \oplus C_i \quad (1)$$

$$C_i = A_{i-1} \cdot B_{i-1} + (A_{i-1} \oplus B_{i-1}) \cdot C_{i-1} \quad (2)$$

The symbol ⊕ represents the Exclusive OR (XOR) operator, Si represents the sum produced by adding the operands Ai, Bi at the i-th level of the adder and Ci represents the carry (possibly) associated thereto.

FIG. 3 illustrates an example of Carry Look Ahead implementation. This circuit does not propagate the carry from a full adder to the subsequent. As opposed thereto, it employs two signals, called the "generate" wire (Gi) and the "propagate" wire (Pi), for the carry computation using the current input Ai and Bi.

$$G_i = A_i \cdot B_i \quad (3)$$

$$P_i = A_i \oplus B_i \quad (4)$$

$$C_i = G_i + P_i \cdot C_{i-1} \quad (5)$$

$$S_i = P_i \oplus C_i \quad (6)$$

Here again the symbol ⊕ represents the Exclusive OR (XOR) operator, Si represents the sum produced by adding the operands Ai, Bi at the i-th level of the adder and Ci represents the carry (possibly) associated thereto.

If one assumes that the delay through an AND gate is equal to one "gate delay" and the delay through an XOR gate is equal to two gate delays, then the Propagate (P) and Generate (G) signals (which only depend on the input bits) will be valid after two and one gate delay, respectively.

Using the above expression to calculate the carry signals, it is not necessary to wait for the carry to ripple through all the previous stages to find its proper value.

This point may be made clear by making reference, e.g., to a 4-bit adder:

$$C1 = G0 + P0 \cdot C0 \quad (7)$$

$$C2 = G1 + P1 \cdot C1 = G1 + P1 \cdot G0 + P1 \cdot P0 \cdot C0 \quad (8)$$

$$C3 = G2 + P2 \cdot G1 + P2 \cdot P1 \cdot G0 + P2 \cdot P1 \cdot P0 \cdot C0 \quad (9)$$

$$C4 = G3 + P3 \cdot G2 + P3 \cdot P2 \cdot G1 + P3 P2 \cdot P1 \cdot G0 + P3 P2 \cdot P1 \cdot P0 \cdot C0 \quad (10)$$

The carry-out bit, Ci+1, of the last stage will be available after four delays (two gate delays to calculate the Propagate signal and two delays as a result of the AND and OR gate). The sum signal can be calculated according to expression (6).

Carry Ripple, Carry Look Ahead, and Carry Skip thus essentially represent different implementations of the same operation. These circuits are however different in terms of performance, namely—in order of importance: speed, area, and power requirements. This disclosure essentially refers to manipulating carries, and thus applies identically to all the possible implementations considered in the foregoing. For instance in the Carry Look Ahead case, the relationship (7) is identical to formula (2), and this is not by chance.

The problem thus arises of estimating with the highest possible accuracy the number of zeroes lying at the left of the sum of the floating point mantissas, in the case of a pure subtraction. This operation must be fast enough, in that the floating point sum involves other "slow" elements: exemplary of these are shifters as used in the re-normalization step (which is the last stage) and in the case where the mantissas are aligned to the same exponent (i.e., the first stage). The IEEE-754 standard for Binary Floating-Point Arithmetic (IEEE-754) defines the format of floating point numbers. Different formats are thus defined: single (32-bit), double (64-bit), and extended precision (80-bit). Each format is characterized by a double representation:

normalized, where the mantissa is preceded by a hidden "1". For instance, the (decimal) floating point number 1.5 is represented by the binary (mantissa) 1.10000, where the first "1" is hidden. The (decimal) floating point number 1.75 is represented by 1.11000 (the first "1" at the right of the point has a weight $2^{-1}=0.5$; the second weight $2^{-2}=0.25$ and so on);

de-normalized, which is used to represent floating point numbers very close to zero. A de-normalized number has a mantissa of the type 0.XYZW where the hidden bit is equal to "0".

If one needs to perform the sum of F1 and F2, where:

$$F1 = 1.5 \times 2^{10}$$

$$F2 = 1.8 \times 2^{11}$$

the final result has an exponent $2^{11}$, whereby the mantissa 1.5 must be aligned with the final result ($2^{11}$).

The "ideal" LZA produces (in a fast manner) an entire string having a length which is equal to the length of the adder with the same number of leading zeroes.

The following formula represents a fast method of computing such a string:

$$S_i = A_i \oplus B_i$$

It will be appreciated that this formula corresponds to the formula (1) above if the carry (Ci)—which is typically a slow signal—is neglected. Such an LZA arrangement operates correctly when:

no carries exist in the chain (which is a rare event), or carries exist that extinguish before the first "1" in the result read from right to left (which is a more frequent event).

For instance, in the case:

```
01000111
00001111
—
01010110
``` the carry is "extinguished" in bit number 4 starting from left.

If conversely the following case is considered:

A=00001111 (a positive number with an exponent lower than the maximum one)

B=00000001 (negative number)

A represents a positive number with an exponent lower than B. The last zero represents the sign of the mantissa, and the following "1" represents a normalization "1" (which is indicated explicitly), while the rest is the actual mantissa (111). The three leading zeroes indicate that the difference between the exponents is 3, whereby the mantissa of A has been duly aligned.

Conversely, B represents (as a complement to 2) the mantissa of a negative number with an exponent higher than the exponent of A. By returning to the original number:

B (orig)=11111111

Such an LZA arrangement would produce 4 leading zeroes are actually three. Consequently the need arises for having a fast (or "early") carry with a high degree of accuracy.

BRIEF SUMMARY OF THE INVENTION

From the foregoing description of the current situation, it emerges that the need exists of defining solutions capable of treating floating-point operations in a more satisfactory way in comparison with the prior art solutions described in the foregoing.

According to the disclosed embodiments of the present invention, a high-speed floating point operation method is provided that also relates to a corresponding system, as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

In accordance with one embodiment of the arrangement described herein, a method of estimating propagated carries in an adder by means of a circuit producing a carry value starting from operands selected out of actual addition inputs and at least one earlier carry is provided. The method includes the step of using, as said circuit, a statistical circuit operating with independent binary traffic for said operands.

The solution described herein provides i.a., a Leading Zero Anticipatory circuit with a marked reduction of the computational error at the expense of a slight increase in semiconductor area and power consumption requirements.

The arrangement described herein estimates the propagated carries in the integer adder starting from the Boolean expression. The arrangement operates with carry propagate adders and a fast carry look ahead circuit (e.g., Brent Kung adders).

The arrangement includes a carry estimator, which permits reduced error propagation. Experimental performance evaluation shows that this new arrangement drastically reduces the error rate and its distribution, overcoming the uncertainty about the use of this arrangement in commercial solutions. Starting from the Boolean expression of a carry propagate signal, the solution described herein employs a carry propagate chain, which minimizes the error occurrences and performs a better error distribution.

Specifically, since the carry propagate chain is truncated, a carry estimator is introduced. This additional circuitry increases the probability of correct carry propagation estimation improving the performance of the LZA arrangement.

Specifically, performance is improved with respect to the case of $S_i=A_i \oplus B_i$ because the estimated carry assumes its true value with an error that decreases as the estimation "depth" increases.

The Boolean expression of the carry estimator starts from a logic function e.g., a Karnaugh Map of the carry propagate signal. This arrangement has a similar map that minimizes the probability of wrong estimation. The approach could be extended to estimators that consider the Boolean expression of the carry propagate signal for a 2-bit adder (depth-2 carry estimator) and more.

In accordance with another embodiment of the invention, a carry estimator for use in a Leading Zero Anticipatory circuit for fast floating-point addition operations is provided. Ideally, the carry estimator circuit is used in a carry ripple adder, but may be used in other adders. The carry estimator includes a carry chain with a given depth, and a carry estimator circuit that performs a logic function to produce an output with a number of leading zeros equal to the leading zeros of a floating point integer addition operation.

In accordance with another embodiment of the invention, a method of implementing a carry estimator circuit is provided. The method includes deriving a logic function for a carry-in expression, generating a logical expression of the logical function, and implementing the logical expression with logical circuits having two or more gate levels.

BRIEF DESCRIPTION OF THE SEVERAL VIEWS OF THE DRAWINGS

The embodiments of the invention will now be described, by way of example only, with reference to the enclosed figures of drawing, wherein:

FIG. 4 shows an example of a Karnaugh map associated with a carry signal,

FIG. 5 shows an example of non-exact closed expression for a generic carry,

FIGS. 6A, 6B, and 6C show an example of a 2-bit adder, a Karnaugh map associated to the 2-adder carry out signal, and an example of carry estimation independent from the preceding carry.

DETAILED DESCRIPTION OF THE INVENTION

The solution described herein, based on the Leading Zero Anticipatory approach, derives from the formula (2) above and takes it as a basis for generating the carry propagate signal. The solution described herein evaluates the carry in the formula (2) in a recursive manner with a depth of the recursive approach generally equal to N.

For the sake of simplicity, in the solution described herein N is selected equal to two or three. A greater value for N introduces a more complex arrangement when compared to the integer adder complexity.

This arrangement produces a word with the same number of leading zeroes with respect to the result produced by the integer addition.

This applies, strictly speaking, to an "ideal" LZA. The arrangement described herein "should" produce a word with the same number of leading zeroes as the integer adder. In fact it performs such a function with an error that can be reduced inasmuch as desirable (at least from the viewpoint of Boolean logic, since the total latency of the circuit must be taken into account).

For this purpose, the Leading Zero Anticipatory logic module performs a non-exact addition, using a partial expression of carry input. As mentioned above, the recursive expression (2) could be developed down to a depth of two or three as follows:

$$C_i = A_{i-1} \cdot B_{i-1} + (A_{i-1} \oplus B_{i-1}) \cdot [A_{i-2} \cdot B_{i-2} + (A_{i-2} \oplus B_{i-2}) \cdot C_{i-2}]$$

The expression above will be truncated at step i−N with a final value for Ci−N.

By increasing the "depth" both of the exact chain and the estimator, the circuit latency increases, thus negatively countering a good deal of the advantages possibly achieved.

In view of this, a reasonable value for the overall "depth" would be the logical 1, but in the solution described herein a statistical circuit is used to improve the error probability operating with independent and identically distributed binary traffic for the operands.

Referring to FIG. 4, and starting from the Karnaugh Map of a generic carry, which depends on the actual inputs (Ai and Bi) and the previous carry signal, a non-exact expression for Ci is derived following the rules:

the expression does not depend on Ci−1, and the expression covers all the logical "1s" in the original Karnaugh Map.

These rules apply, of course, when the decision depth of the estimator is equal to one. In the case of an estimator of order N, Ci−1 is to be replaced by Ci−N. An exemplary, non-exact expression for Ci, as shown in FIG. 5 is:

$$Ci=Ai+Bi$$

where the Boolean operation is a simple inclusive OR (+) of the input operands.

Figure 6A:
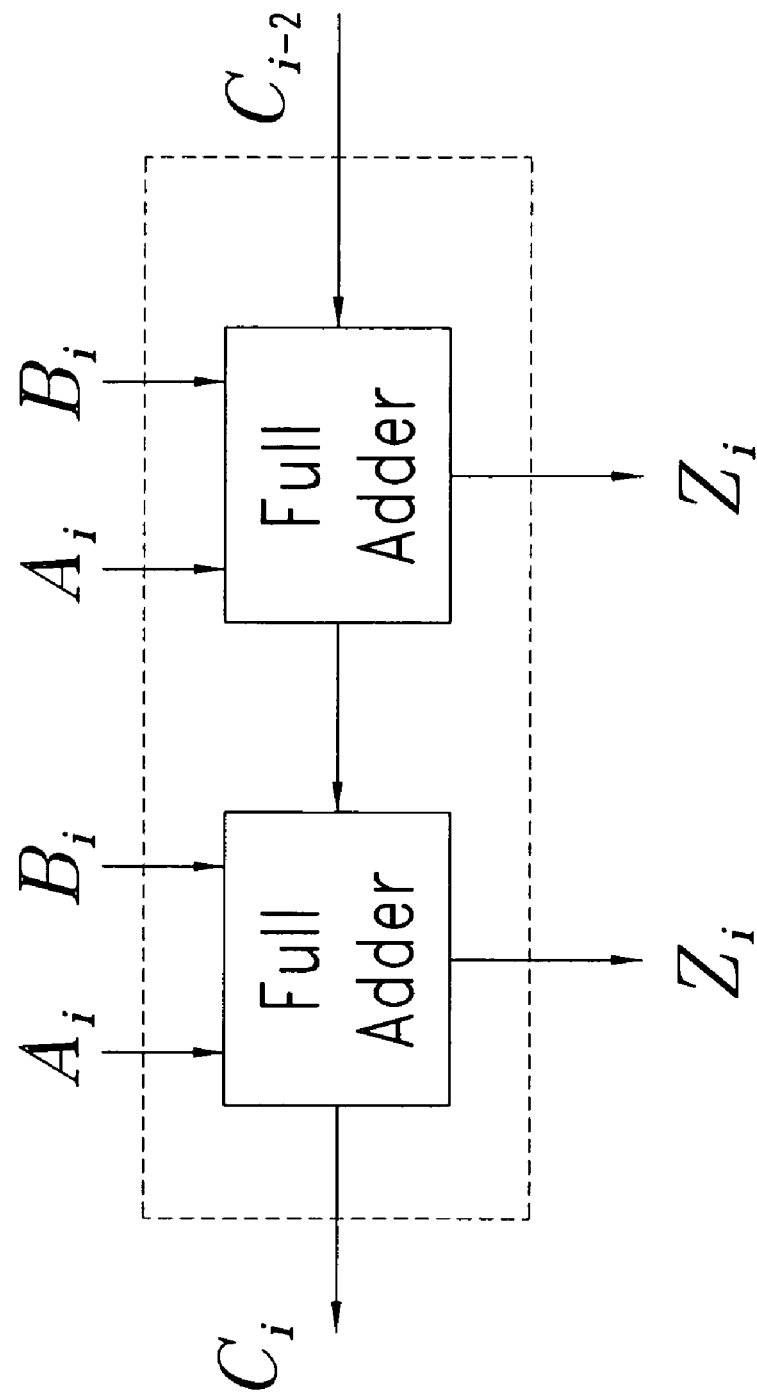

This carry implicates an error probability of $\frac{2}{8}$ under the independent and identically distributed assumption. Using a logical 1 as the carry estimator, the error probability should be $\frac{4}{8}$. The simulation result confirmed this theoretical approach. This method could be easily extended to any carry Boolean expression with depth more than one, using the rules above. In particular for a depth equal to two the Karnaugh Maps of FIGS. 6A, 6B and 6C are obtained, which justify the following formula for the generic carry estimator $$C_i = A_i \cdot B_i + (A_i + B_i) \cdot (A_{i-1} + B_{i-1})$$

In this last case the error probability is equal to $\frac{1}{8}$.

In a simple case (equiprobable input traffic) the error is the sum of the cases where the Karnaugh Map of FIG. 4 differs from the map shown in FIG. 5. Additionally, the ratio to the number of possible cases (namely the number of cases in the map—here equal to 8) must be taken into account.

The effectiveness of the solution described herein can be proved i.a., by designing a Real Time Logic model (Verilog) of the floating-point signed adder. The simulations permit data collecting, performing 100,000 random floating-point signed additions.

Figure 7:
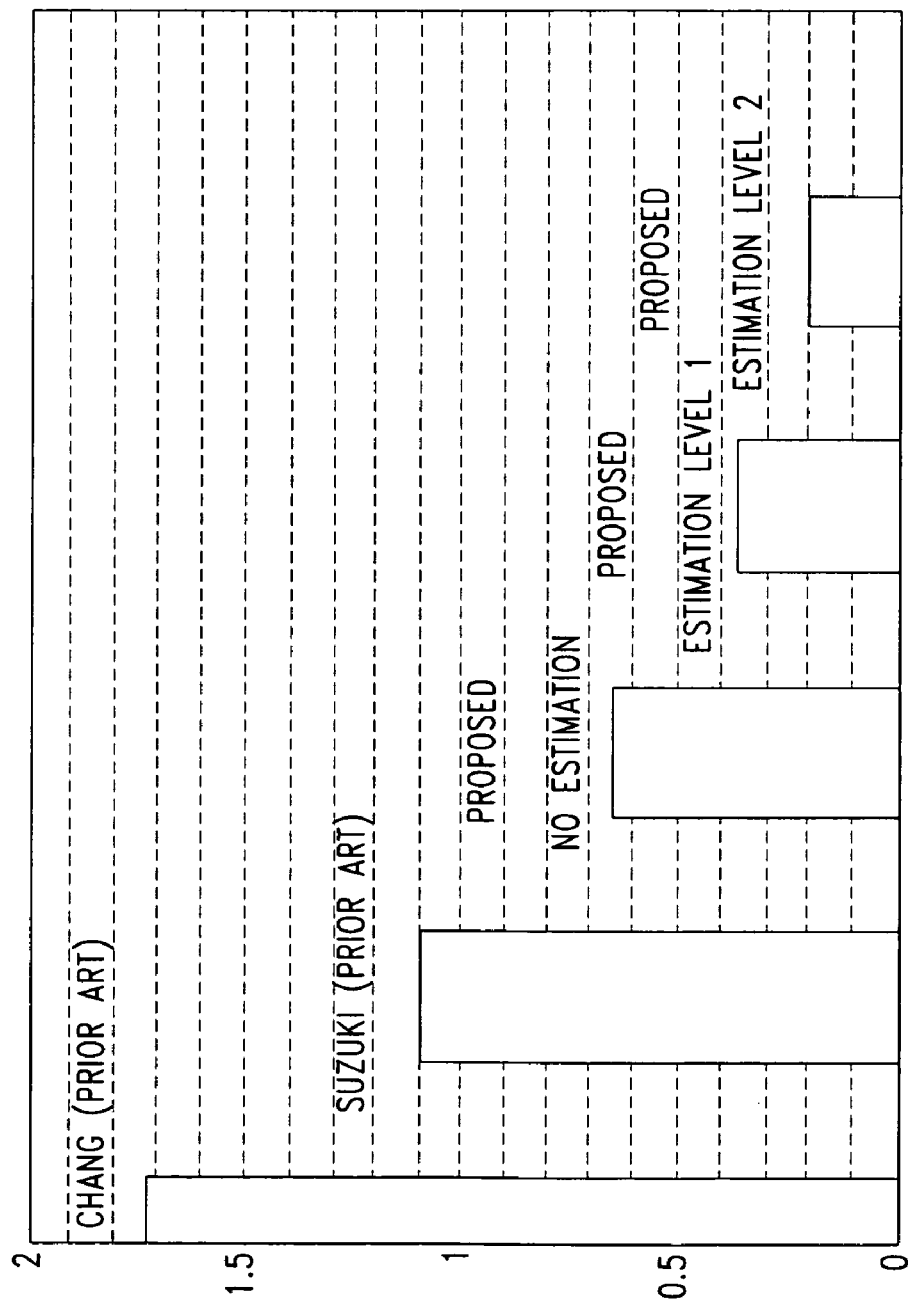
FIG. 7 shows a histogram of the percentage of wrong-signed additions.
Figure 8:
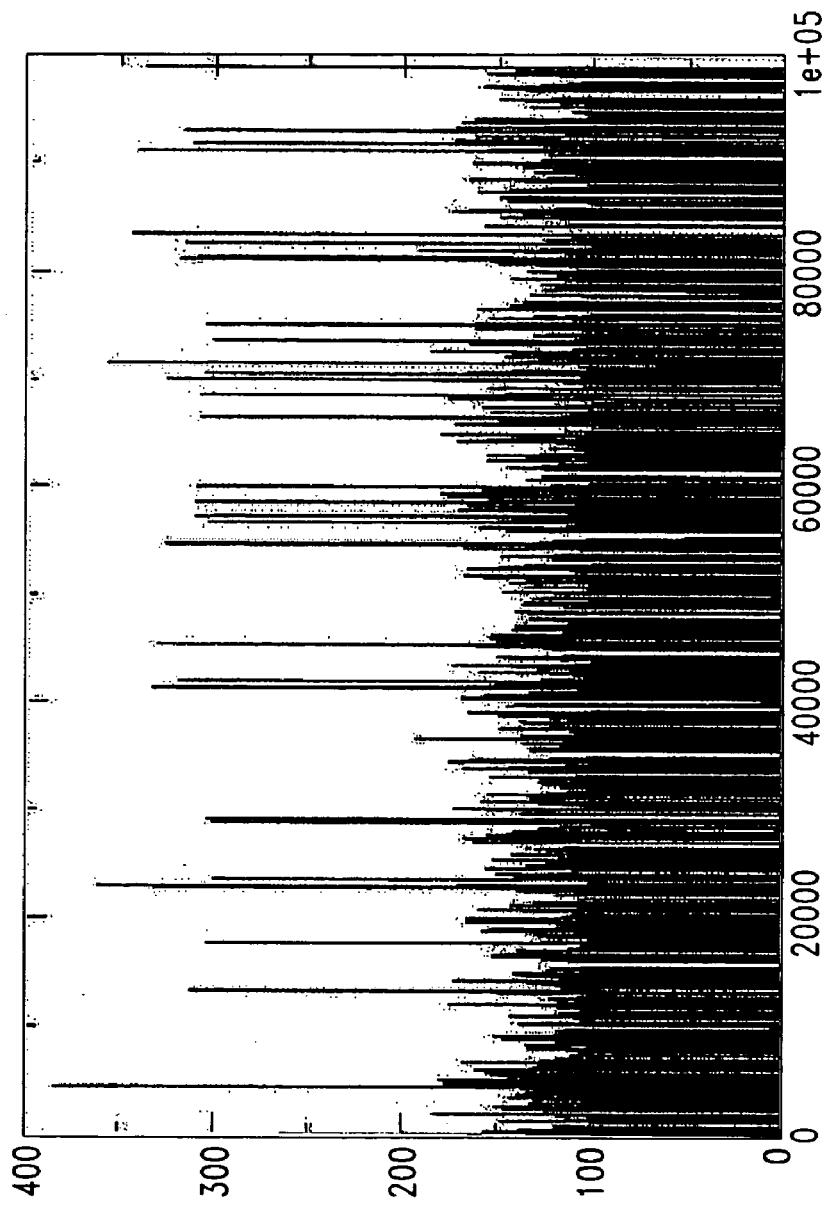
FIG. 8 shows an example of error distribution of a prior art arrangement.
Figure 9:
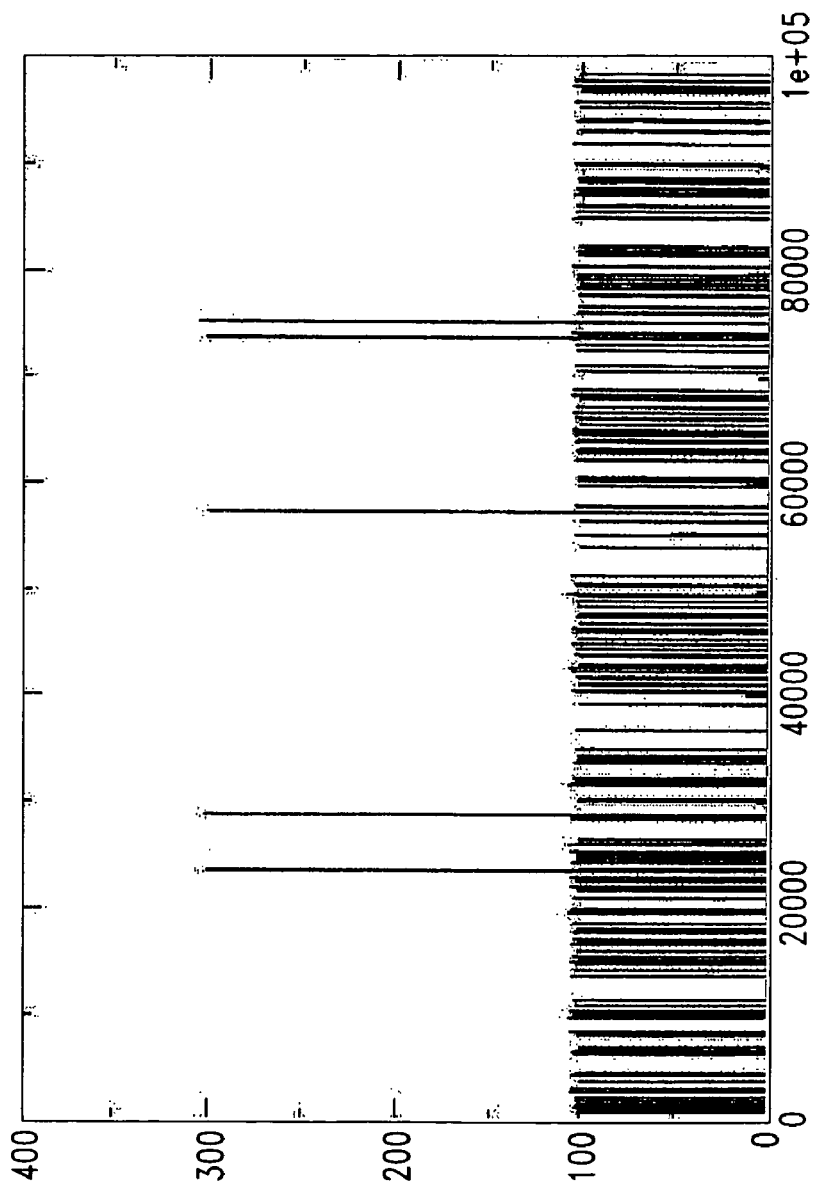
FIG. 9 shows an example of error distribution of the arrangement described herein.

The occurrences of bad addition and the error distribution can thus be evaluated. FIG. 7 illustrates the percentage of wrong addition using the LZA approach of prior methods and in the proposed solutions. FIGS. 8 and 9 illustrate the error distribution.

The Boolean expression of the described LZA solution has different circuit implementations for different design constraints: low area, low-power and low-latency. As far as the carry estimator circuit design is concerned, the circuits of FIGS. 10A and 10B perform the estimation with level one and two according to the Boolean expression of the described LZA solution.

The chain of carries described has different implementations.

Figure 10B:
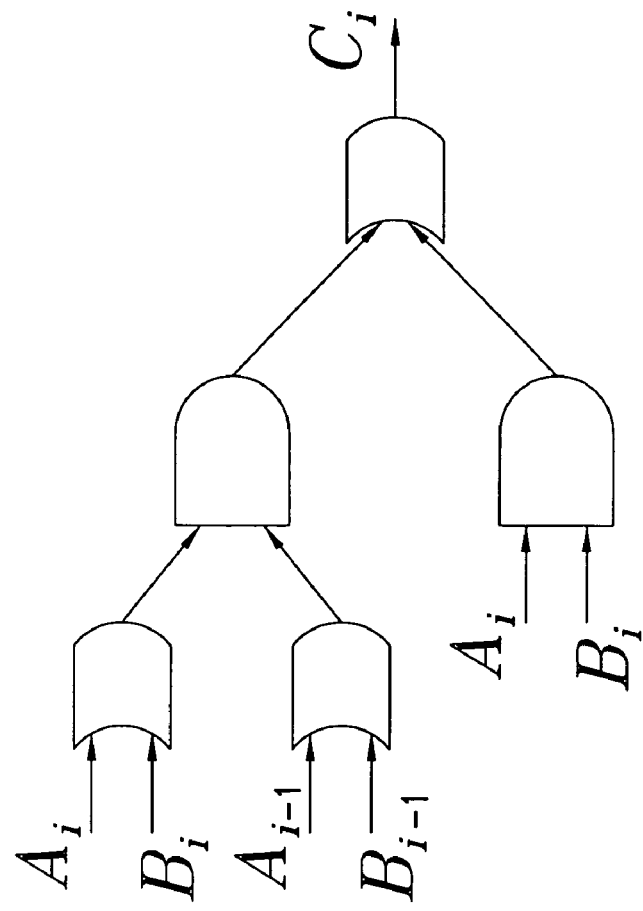
FIGS. 10A and 10B show an example of level 1 carry estimator and an example of level 2 carry estimator.
Figure 10A:
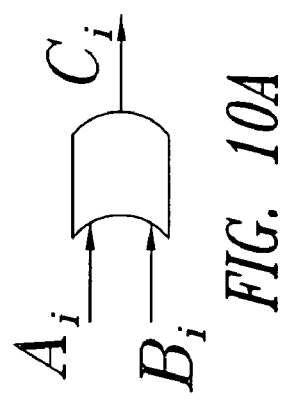
Figure 11:
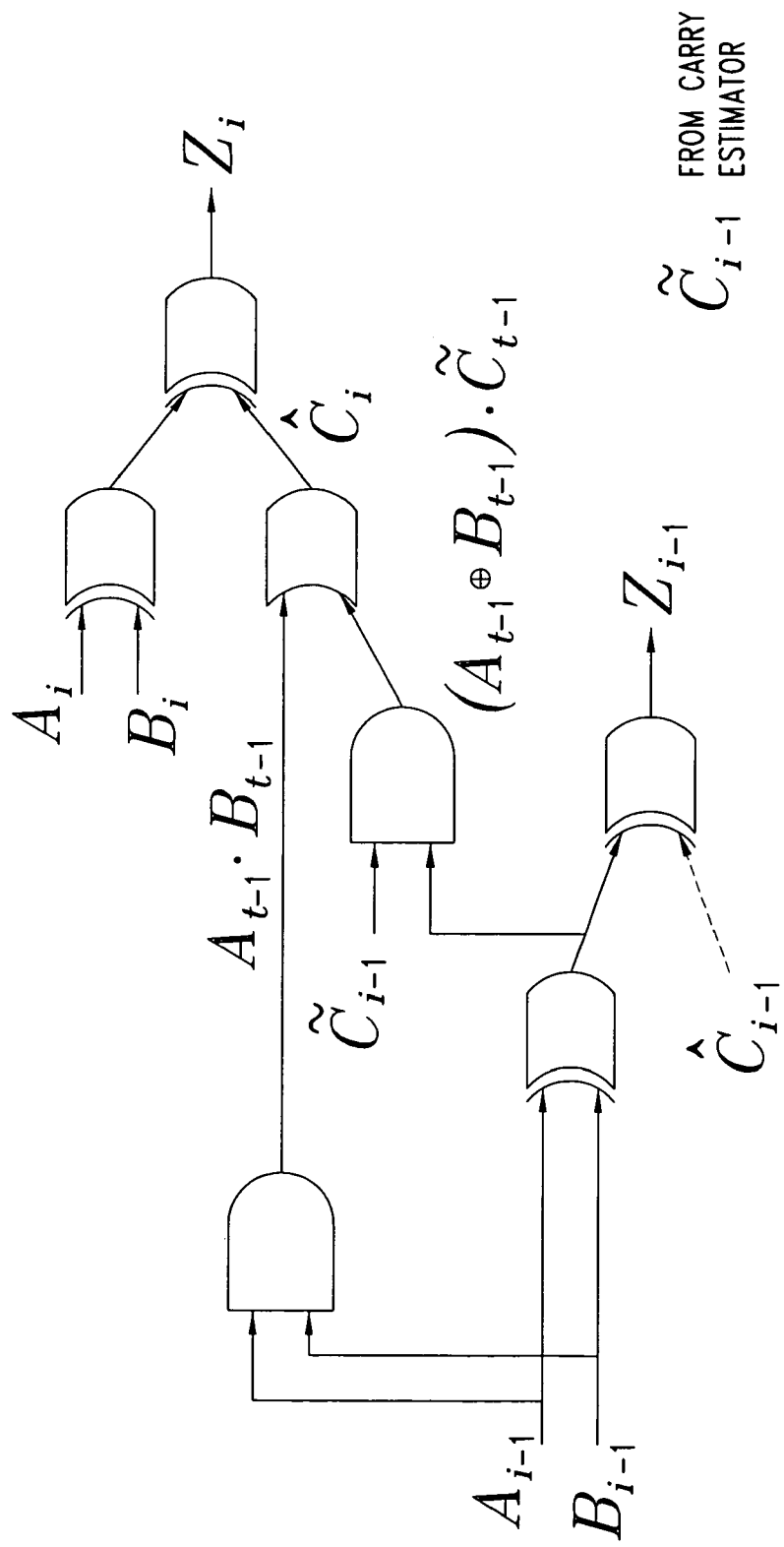
FIG. 11 shows an exemplary implementation of the arrangement described herein.

The illustrations of FIGS. 10A and 10B represent a possible solution with the minimum area (and power) consumption. More specifically, the two portions of FIGS. 10A-B, designated 10A and 10B, refer to estimators having depths equal to 1 and 2, respectively (see also FIGS. 5 and 6A-C). Conversely, FIG. 11 (with N equal to one) is representative of a part of an LZA arrangement. One can distinguish the i-th output Zi, deriving from an XOR of Ai and Bi as well as an estimated carry. This carry is generated by means of an "exact chain" having a depth equal to one (see formula 2 above).

A commercial synthesis tool could change this implementation (e.g., with more parallelism) in order to meet the timing constraints.

This solution employs an unrolled expression for the generic carry used in a leading zero anticipatory logic for fast floating-point addition. This solution could be used both in carry ripple or in carry propagate adders (look ahead and Brent Kung).

Additionally, a generic carry estimator is provided for breaking the carries chain with a consistent value that minimizes the error probability under independent and identically distributed traffic.

The effectiveness of this approach has been demonstrated starting from a Real Time Logic architectural description of a single precision floating-point signed adder passing through a physical implementation evaluating the area overhead. Moreover a gate level simulation has permitted an error analysis comparing the present invention with the current methodology. The results show how the arrangement described herein drastically reduces the error occurrences and permits an easier implementation in embedded commercial cores.

While the foregoing embodiment primarily refers to a Carry Ripple Adder, the modifications required in the case of e.g., Carry Look Ahead (CLA) adder are very minor.

Figures 1A, 1B:
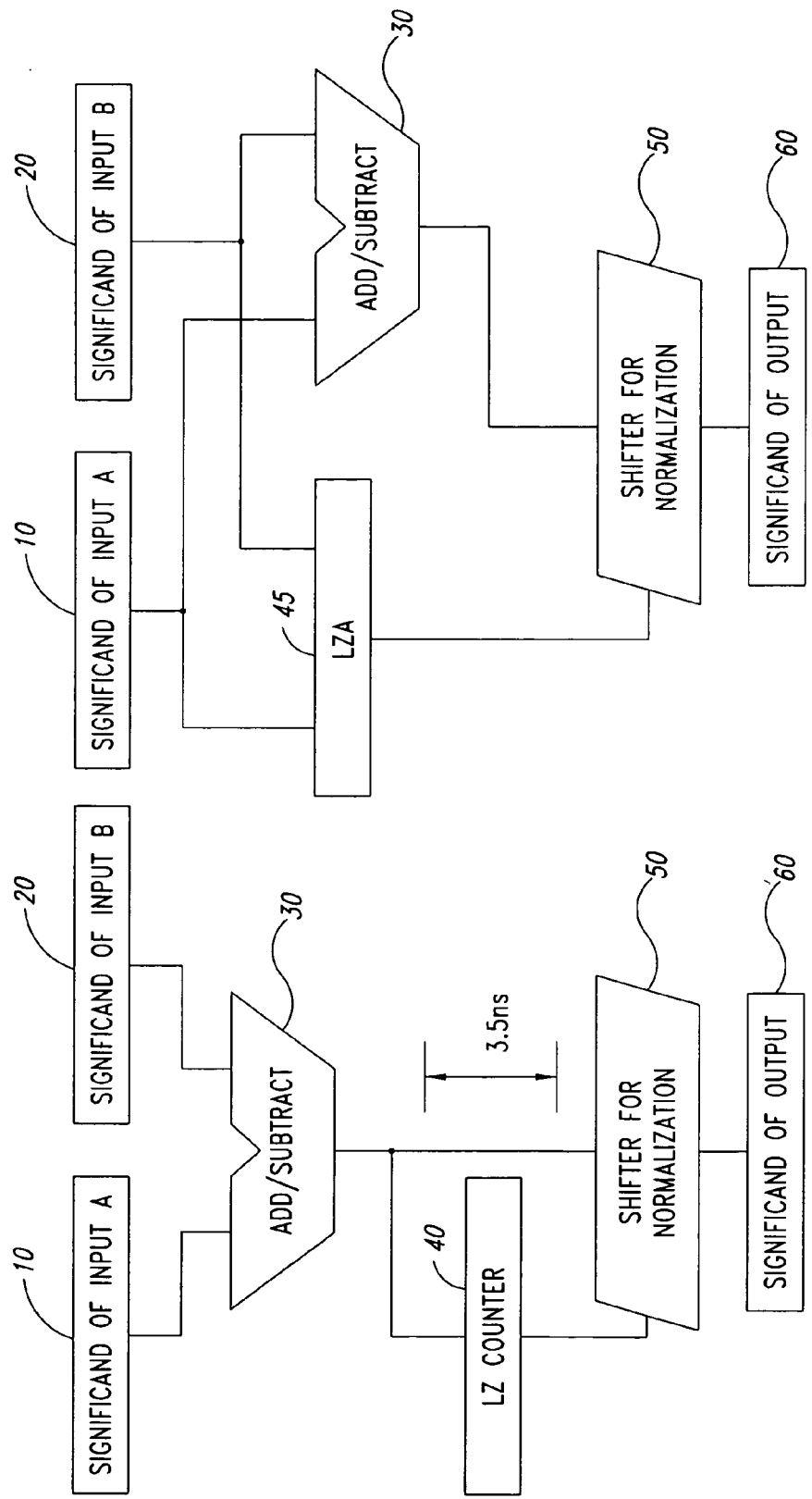
FIGS. 1A, 1B, 2, and 3 have been described in the foregoing.
Figure 2:
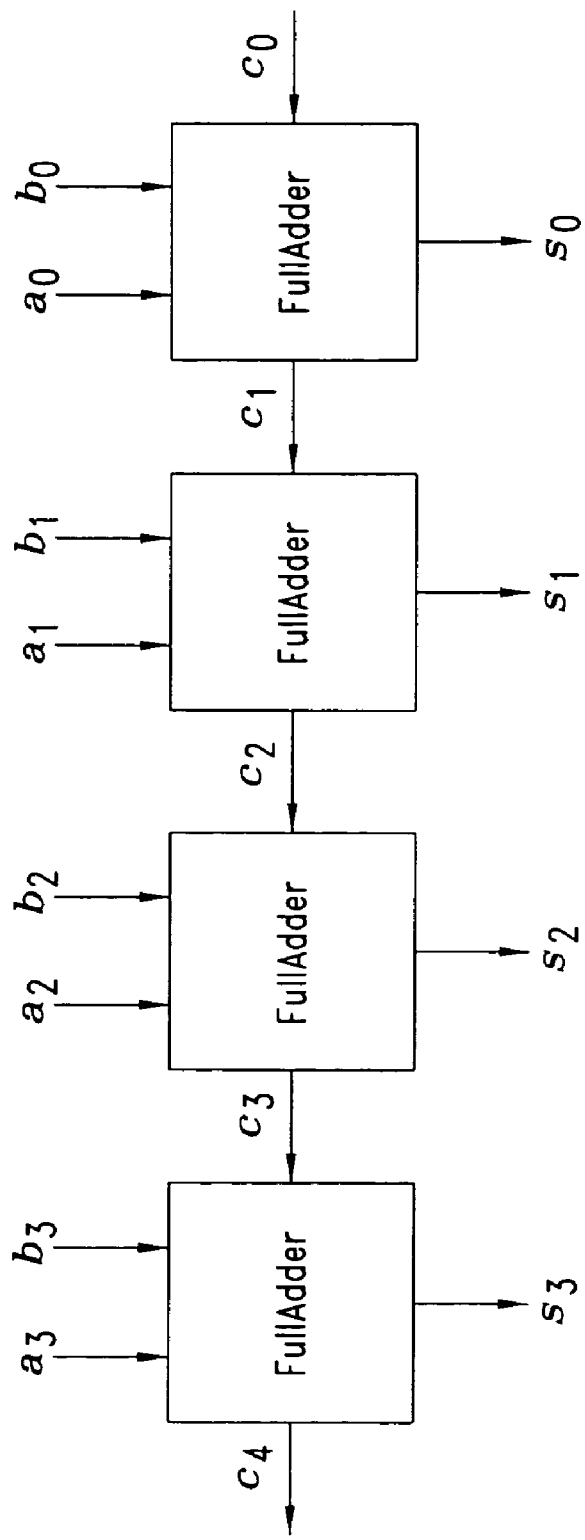
Figure 3:
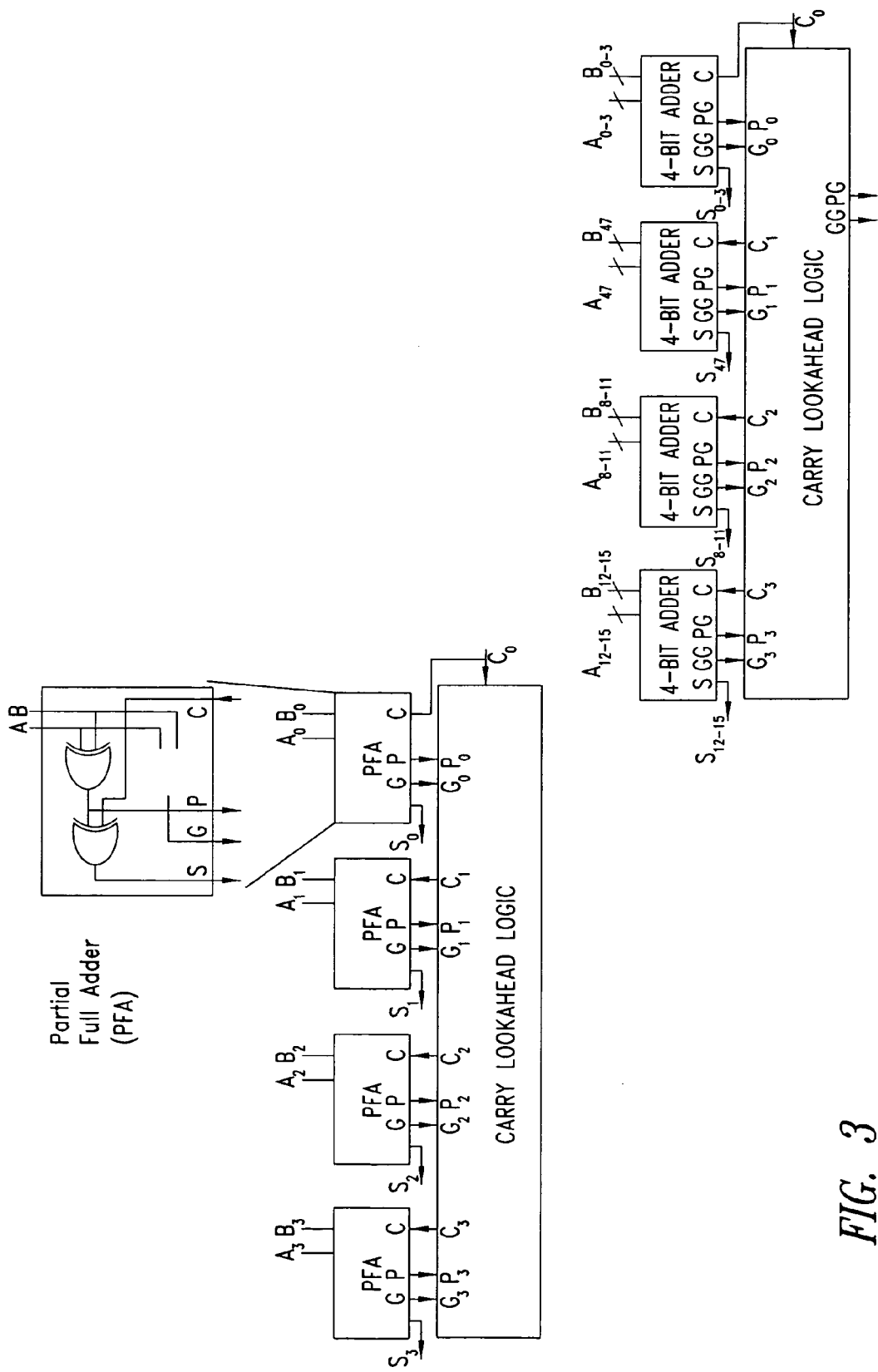

If one uses an exact chain of order equal to 1 and a carry estimator, the generic block (i.e. a four-bit adder as shown in FIG. 3) has an input carry corresponding to the logical function $$Ci+1 = Gi + Pi \cdot Ci-1 \text{ (estimated)}$$

In the case of an exact chain of order two one has:

$$Ci+1 = Gi + Pi \cdot Gi-1 + Pi \cdot Pi-1 \cdot Ci-2 \text{ (estimated)}$$

In the case of a CLA, the carry estimator is within the Carry Look Ahead logic (see FIG. 3).

To sum up, the arrangement described herein provides for a carry that is generated by the sequence of two circuits, namely:

the exact replica of the carry chain with a given depth, and a carry estimator as a logic function independent of the previous carries, which minimizes the possibility of error. Also this circuit has a given depth.

Additionally, one tries to safeguard the "1s" of the original logic function as these correspond to possible cases of carry propagation.

The final circuit produces a carry equal to one in a number of cases which is higher (never lower, see also FIGS. 4 and 5) than the ideal case. In more complex cases, where a higher estimation depth is used, the Boolean function depends on a higher number of variables. More specifically, when the order is N, the original function has 2*N+1 variables, in the order C0, A0, B0, A1, B1, . . . , A(N−1), B(N−1).

Even when Karnaugh Maps are not available, a logical function is always available (possibly in the form of a table). Such a table can be re-formulated according to two basic points, namely:

i) the expression for Ci does not depend on Ci−1;

ii) such an expression covers each and every logical 1 in the original Karnaugh Map, and it can be implemented in the form of circuits having two or more logic levels.

To be very precise, referring to Karnaugh Maps is not completely proper, insofar as these maps are representative of the more general concept of the "logical function" defining the value of the carry.

Karnaugh Maps give a clear impact, but their use is limited to few Boolean variables. In the more general case, the logical function which represents the carry can be transformed by leaving all the implicants unchanged by simply adding or simplifying some logical implicants due to the conversion from 0 to 1 of the logical function.

Consequently, other techniques for synthesizing logical networks having two or more levels (such as Quine-McClusky) can be used for that purpose by referring to criteria such as the minimum area or power consumption or minimum delay.

Additionally, those of skill in the art will promptly appreciate that referring to an equiprobable input traffic is just an assumption made for the sake of simplicity of representation. The input traffic may in fact be considered as "quasi" equiprobable. Referring to truly equiprobable traffic just makes it easier to compute the error probability as the ratio of the favorable cases to all possible cases.

If the input traffic cannot be considered equiprobable (but is in any case independent) an automatic procedure can be easily set up to minimize the error probability by attempting all the possible configurations of the logical function that satisfy the requirements set forth in the foregoing.

The carry estimator has a specific depth value, and experiments show that the accuracy of operation of the circuit increases if the depth is increased. This of course has an impact in terms of hardware requirements and timing. Consequently, a reasonable compromise must be reached depending on the architectural and design requirements (number of pipeline stages available, technological libraries, and so on).

Consequently, without prejudice to the underlying principles of the invention, the details and the embodiments may vary, also appreciably, with reference to what has been described by way of example only, without departing from the scope of the invention as defined by the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A method of generating an input carry using estimated propagated carries in a carry look-ahead (CLA) adder, the method comprising: using an estimator circuit to generate an estimate of a previous carry-in, the estimator circuit operating with binary signals for operands Ai and Bi that are used by the adder and are provided to the estimator circuit as well as the CLA adder, wherein an estimated carry in $C_i$ (estimated) of operands Ai and Bi is equal to Ai+Bi, the estimator circuit using a logic function that is independent of previous carries and that covers every logical 1 generated by use of one from among a Karnaugh Map, a Quine-McClusky table, or a table that identifies with the logical 1 value all possible operand combinations that generate a propagated carry in the CLA adder; and when a recursive depth is 1, the method further including implementing the circuit to use the estimated previous carry-in to generate the input carry corresponding to $C_{i+1} = G_i + P_i \cdot C_{i-1}$ (estimated), and when the recursive depth is 2, the input carry corresponds to $C_{i+1} = G_i + P_i \cdot G_{i-1} + P_i \cdot P_{i-1} \cdot C_{i-2}$ (estimated).

2. The method of claim 1 wherein the adder is a leading zero anticipatory logic integer adder producing a number having a same number of leading zeroes as a result of integer addition.

3. A method of generating an input carry using estimated propagated carries in a carry look-ahead (CLA) adder having addition inputs by means of a circuit, the method comprising producing via the circuit a propagated carry starting from operands Ai and Bi selected out of the addition inputs and an estimated at least one earlier carry, wherein an estimated carry in $C_i$ (estimated) of operands Ai and Bi is equal to Ai+Bi, and wherein the circuit produces the estimated at least one earlier carry using a logical function of the operands that applies to all logical "1s" in the logical function that are identified from the use of one from among a Karnaugh Map or a Quine-McClusky table; and when a recursive depth is 1, the method further including implementing the circuit to use the estimated at least one earlier carry-in to generate the input carry corresponding to $C_{i+1} = G_i + P_i \cdot C_{i-1}$ (estimated), and when the recursive depth is 2, the input carry corresponds to $C_{i+1} = G_i + P_i \cdot G_{i-1} + P_i \cdot P_{i-1} \cdot C_{i-2}$ (estimated).

4. The method of claim 3 wherein said adder is a leading zero anticipatory logic integer adder producing a number having a same number of leading zeroes as a result of integer addition.

5. A circuit for generating an input carry using estimated propagated carries in a carry look-ahead (CLA) adder by producing a carry value starting from operands Ai and Bi selected out of actual addition inputs and at least one earlier carry, wherein an estimated carry in $C_i$ (estimated) of operands Ai and Bi is equal to Ai+Bi, the circuit comprising: a carry estimator circuit to generate an estimate of a previous carry-in, the estimator circuit operating using binary signals for the operands, the carry estimator circuit adapted to use a logic function that is independent of previous carries and that covers each and every logical 1 generated by use of one from among a Karnaugh Map, a Quine-McClusky table, or a table that identifies with the logical 1 all possible operand combinations that generate the carry value; and when a recursive depth is 1, the circuit is implemented to use the estimated previous carry-in to generate the input carry corresponding to $C_{i+1} = G_i + P_i \cdot C_{i-1}$ (estimated), and when the recursive depth is 2, the input carry corresponds to $C_{i+1} = G_i + P_i \cdot G_{i-1} + P_i \cdot P_{i-1} \cdot C_{i-2}$ (estimated).

6. The circuit of claim 5 wherein said adder is a leading zero anticipatory logic integer adder producing a number having a same number of leading zeroes as a result of integer addition.

7. A method of implementing a circuit in an adder that uses operands as inputs, comprising:
    deriving an estimated previous carry-in value by using a logic function that does not utilize any previous carry-in value and that applies to all operand combinations that generate a carry in the adder by using either a Karnaugh Map, a Quine-McClusky table, or a table that identifies all operand combinations that generate a carry in the adder, wherein an estimated carry in $C_i$ (estimated) of operands Ai and Bi is equal to Ai+Bi;
    generating a logical expression of a carry-in value that uses the estimated previous carry-in value derived by the logical function; and
    implementing the logical expression with logic circuits having two or more gate levels, the logical expression comprising:

$C_{i+1} = G_i + P_i \cdot G_{i-1} + P_i \cdot P_{i-1} \cdot C_{i-2}$ (estimated).

8. The method of claim 7 wherein implementing comprises implementing the logical expression in a leading zero anticipating logic integer adder.

9. The method of claim 7 wherein implementing comprises implementing the logical expression in a carry look-ahead adder.

* * * * *